April 17, 1962 N. J. DOCTOR 3,029,495

ELECTRICAL INTERCONNECTION OF MINIATURIZED MODULES

Filed April 6, 1959

INVENTOR

NORMAN J. DOCTOR

BY S. J. Rotondi, A. J. Dupont, J. E. McGee & N. Cass

3,029,495
ELECTRICAL INTERCONNECTION OF MINIATURIZED MODULES

Norman J. Doctor, Wheaton, Md., assignor to the United States of America as represented by the Secretary of the Army Filed Apr. 6, 1959, Ser. No. 804,558
2 Claims. (Cl. 29—155.5)
(Granted under Title 35, U.S. Code (1952), sec. 266)

The invention described herein may be manufactured and used by or for the Government for governmental purposes without the payment to me of any royalty thereon.

This invention relates generally to microminature electronic techniques, and more particularly to the electrical interconnection of microminature electronic subassemblies.

In electronic equipment intended for military applications, three important criteria exist: (1) low weight and small volume, (2) rugged assembly to enable survival in high shock and vibration environments, and (3) ease of repair by personnel having a minimum of special training. Miniaturization techniques have been found to go a long way toward meeting both of the first two criteria. The facts that miniature assemblies occupy less volume and are lower in weight than their full-size counterparts are self-evident. It is also well known that tiny structures are much more resistant to damage from shock and vibration than large structures. Efforts to provide the third criterion resulted in the development of electronic "module"—that is, an individually fabricated subassembly that may be replaced in toto when repair becomes necessary.

In order to meet all three criteria, the next obvious step was to combine miniaturization and modular techniques. Applying miniaturization techniques to a module enabled the size of the individual module to be so greatly reduced that it was now found desirable to combine a considerable number of these tiny modules into one large module which could be replaced in toto. A difficulty arose, however, as to how these tiny modules could be electrically interconnected with each other without losing the advantages obtained by miniaturization. In the prior art two main techniques have been employed for accomplishing this interconnection. The first technique involves welding together the tiny wires protruding from each individual module at appropriate connection points using procedures developed in the subminiature vacuum tube field. This welding technique is not only expensive but takes an inordinate amount of time and great care must be taken to prevent shorting between leads.

The second technique employed for obtaining electrical interconnection between the miniaturized modules involves the use of an etched wiring board in which each of the modules is plugged. Connections are made between etched wiring board terminals and the wires protruding from the modules by hand soldering or dip soldering. The main disadvantage of this etched board interconnection technique is that each soldered connection takes up an appreciable amount of space, thereby limiting the number of interconnections that can be made on a given area of etched wiring board. The result is that it becomes quite difficult, and in some cases impossible, to interconnect miniaturized modules without significantly detracting from the miniaturization which otherwise could have been obtained.

It is the principal object of the present invention, therefore, to provide a new technique for electrically interconnecting miniaturized modules which overcomes the disadvantages of the two above-mentioned prior art techniques.

Another object is to provide a hermetically-sealed module comprising a number of miniaturized modules electrically interconnected together so as to provide a high degree of overall miniaturization.

A further object is to provide improved methods for making the module of the aforementioned object.

In a typical embodiment of the invention a number of miniaturized two-dimensional printed circuit modules of substantially the same size are alternately stacked with suitable spacers, so that all module lead wires protrude from one side of the assembly. The resultant assembly is then encapsulated in resin and the side containing the wires is faced off so that the module wires form cross sections which serve as interconnection points. The desired interconnection paths between the wire cross sections are then milled in the faced-off side of the encapsulated stack and a suitable metal deposited over the faced-off side. The faced-off side is then subjected to a second facing operation which results in leaving the metal only in the interconnection grooves so that the desired electrical interconnections are accomplished. Since no solder terminals or any other special terminals are required, very fine interconnection lines may be achieved, thereby permitting a great number of interconnections to be made on a given face. The resultant large module, therefore, is highly miniaturized, and at the same time hermetically seals the constituent minaturized modules therein.

The specific nature of the invention, as well as other objects, uses, and advantages thereof, will clearly appear from the following description and from the accompanying drawing, in which.

Figure 1:
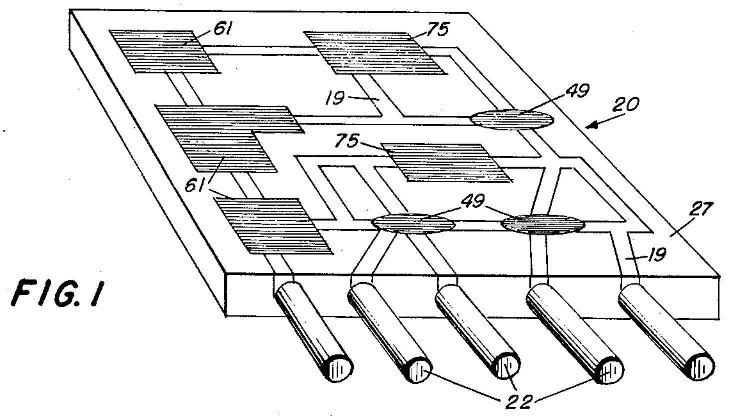
FIG. 1 is a pictorial view of one type of miniaturized two-dimensional printed circuit module which may be interconnected with other similar modules in accordance with the invention.

In FIG. 1, a miniaturized two-dimensional printed circuit module 20 is shown, comprising conventional printed circuit elements 61, 75 and 49 printed on a suitable ceramic wafer 27 in accordance with well known practice. A wiring pattern 19 on the wafer 27 serves to connect the various printed circuit elements to each other and to suitable protruding wires 22 at one edge of the wafer 27. Detailed information as to how such a two-dimensional printed circuit element 20 can be constructed can be found in the article "Microminature Components for Electronic Circuits" in Electrical Manufacturing, August 1958, pp. 96–97.

Figure 2:
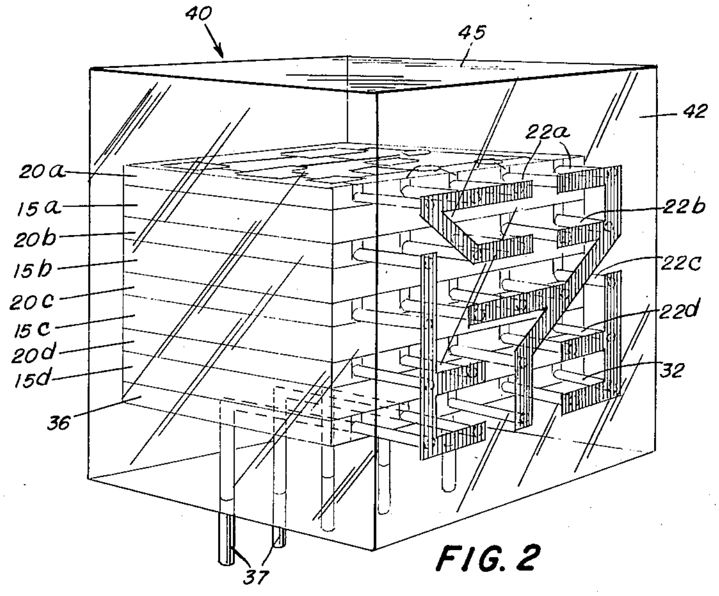
FIG. 2 is a pictorial view of the resultant large module comprising a number of two-dimensional printed circuit modules interconnected in accordance with the invention.

In FIG. 2, four two-dimensional modules **20*a*, 20*b*, 20*c* and 20*d* of substantially the same form as the module 20 of FIG. 1 are alternately stacked with suitable spacers 15*a*, 15*b*, 15*c* and 15*d* so that the module wires 22*a*, 22*b*, 22*c* and 22*d* all protrude from one side of the assembly. The thicknesses of the spacers 15*a*, 15*b*, 15*c* and 15*d* are exaggerated for greater clarity in FIG. 2. It is to be understood, however, that these spacers 15 need only be thin sheets of insulating material so that the resultant assembly will have a volume practically the same as the total volume of the four two-dimensional modules. An end spacer 36 at the bottom of the assembly having protruding wires 32 and terminals 37** extending perpendicularly from the bottom of the assembly serves to permit the resultant assembly to be plugged into suitable associated equipment.

The resultant assembly is then encapsulated in a suitable resin 45, such as epoxy resin, to form a resin block 40 as shown in FIG. 2. A transparent resin is assumed for this description. The side 42 of the block 40 through which the module wires 22 protrude is faced off by any suitable method, such as by using a lathe or milling machine, so that the module wires 22 appear as cross sections in the face 42. As will hereinafter be described, these cross sections serve as interconnection points for interconnecting the module wires 22. The terminals 37 extending perpendicularly from the spacer 30 are adapted to protrude through the bottom side of the resin block 40 as shown in FIG. 2.

To electrically interconnect the interconnection points formed by the cross sections of the module wires 22 in the face 42 of the resin block 40, several methods have been successfully used. One method involves first depositing a metal over the entire faced-off surface. Copper deposited by chemical reduction has been found satisfactory for this purpose. Using well known photolithographic techniques a resist is then laid down on the copper surface, exposed through a mask of the desired interconnection pattern, developed, and washed. The extraneous copper is then etched away, in accordance with well known etching practices leaving the desired electrical interconnection pattern as shown in FIG. 2. A thin plastic coating is then provided to protect the interconnection pattern.

In a variation of the above described method, thin interconnection grooves are first milled in the faced-off side 42 of the encapsulated block 40 and then copper deposited over the entire face 42, as above. The metal not in the grooves is then removed by a second facing operation or by means of an abrasive, thereby leaving the copper only in the interconnection grooves to form the desired electrical interconnection pattern. A protective plastic coating may then be provided as before.

Another method which may be used for making electrical interconnections between the module wire cross sections in the face 42 is by application of a silver pattern in accordance with well known "silk screen" techniques.

It is to be understood that although an electrical interconnection pattern has been shown provided on only one face of the resin block 40 in the illustrative description of FIG. 2, the invention may also be suitably adapted to provide electrical interconnection patterns on additional faces for modules having wires protruding from more than one edge thereof. It is also to be understood that although the invention has been illustrated as applied to the electrical interconnection of the two-dimensional miniaturized modules shown in FIG. 1, other sizes, shapes and types of modules may be interconnected in accordance with this invention.

It will be apparent, therefore, that the illustrative embodiments described are only exemplary and that various modifications can be made in the construction, method and arrangement within the scope of the invention as defined in the appended claims.

I claim as my invention:

1. An improved method for electrically interconnecting miniaturized electronic modules, said method comprising the steps of: constructing modules with lead wires extending from at least one side thereof, stacking said modules with insulating spacers where necessary so that the lead wires to be interconnected are substantially parallel, encapsulating the stacked assembly in a resin to form a resin block with the lead wires protruding therefrom, facing off the side of the resin block containing the protruding wires so that the parallel wires form cross sections therein, and electrically interconnecting the wire cross sections by photolithographic and etching techniques in accordance with a desired interconnection pattern.

2. The invention in accordance with claim 1, wherein the step of interconnecting the wire cross sections is accomplished by employing "silk" screening techniques.

References Cited in the file of this patent

UNITED STATES PATENTS

| | | |
|---|---|---|
| 2,694,185 | Kodama | Nov. 9, 1954 |
| 2,752,537 | Wolfe | June 26, 1956 |
| 2,816,252 | Saunders | Dec. 10, 1957 |
| 2,862,992 | Franz | Dec. 2, 1958 |
| 2,899,608 | Wellard | Aug. 11, 1959 |